United States Patent
Pronk et al.

(10) Patent No.: US 10,237,604 B2
(45) Date of Patent: Mar. 19, 2019

(54) METHOD AND APPARATUS FOR GENERATING A RECOMMENDATION FOR AT LEAST ONE CONTENT ITEM

(75) Inventors: Severius Petrus Paulus Pronk, Eindhoven (NL); Adolf Proidl, Eindhoven (NL)

(73) Assignee: S.I.SV.EL SOCIETA' ITALIANA PER LO SVILUPPO DELL'ELETTRONICA S.P.A., (TO) (IT)

( * ) Notice: Subject to any disclaimer, the term of this patent is extended or adjusted under 35 U.S.C. 154(b) by 1410 days.

(21) Appl. No.: 12/095,001

(22) PCT Filed: Nov. 24, 2006

(86) PCT No.: PCT/IB2006/054423
§ 371 (c)(1),
(2), (4) Date: May 27, 2008

(87) PCT Pub. No.: WO2007/063466
PCT Pub. Date: Jun. 7, 2007

(65) Prior Publication Data
US 2008/0288982 A1    Nov. 20, 2008

(30) Foreign Application Priority Data
Nov. 30, 2005   (EP) .................................. 05111528

(51) Int. Cl.
*G06F 13/00* (2006.01)
*H04N 5/445* (2011.01)
(Continued)

(52) U.S. Cl.
CPC ....... *H04N 21/4147* (2013.01); *H04N 21/458* (2013.01); *H04N 21/4532* (2013.01);
(Continued)

(58) Field of Classification Search
USPC ....................................................... 725/46, 47
See application file for complete search history.

(56) References Cited

U.S. PATENT DOCUMENTS 5,534,911 A * 7/1996 Levitan ............................ 725/46
5,559,548 A * 9/1996 Davis ..................... H04N 5/445
348/E5.099
(Continued)

FOREIGN PATENT DOCUMENTS

EP       1484693 A1   12/2004
JP       11220666 A    8/1999
(Continued)

OTHER PUBLICATIONS

Nygren et al: "An Agent System for Media on Demand Services"; Proceedings of the International Conference on the Practical Application of Intelligent Agents and Multi-Agent Technology, Apr. 22, 1996, pp. 437-454.
(Continued)

*Primary Examiner* — Jonathan V Lewis
(74) *Attorney, Agent, or Firm* — Workman Nydegger

(57) ABSTRACT

A recommender engine (107_1, 107_2, 107_3) recommends further content items for playout on a personalized content channel on the basis of a profile (109_1, 109_2, 109_3) associated with that personalized content channel. The profile (109_1, 109_2, 109_3) includes an indication of the user's "like" and "dislike" of content items played out on said personalized channel.

6 Claims, 1 Drawing Sheet

(51) Int. Cl.
*G06F 3/00* (2006.01)
*H04N 21/4147* (2011.01)
*H04N 21/45* (2011.01)
*H04N 21/458* (2011.01)
*H04N 21/466* (2011.01)
*H04N 21/475* (2011.01)

(52) U.S. Cl.
CPC ..... *H04N 21/4666* (2013.01); *H04N 21/4668* (2013.01); *H04N 21/4756* (2013.01)

(56) References Cited

U.S. PATENT DOCUMENTS

| | | | |
|---|---|---|---|
| 5,664,046 A * | 9/1997 | Abecassis | 386/206 |
| 5,886,691 A * | 3/1999 | Furuya et al. | 715/721 |
| 6,671,736 B2 * | 12/2003 | Virine | G09F 27/00 709/219 |
| 6,774,926 B1 * | 8/2004 | Ellis | H04N 5/44543 348/14.01 |
| 7,013,290 B2 * | 3/2006 | Ananian | G06F 17/30867 705/26.42 |
| 7,899,915 B2 * | 3/2011 | Reisman | G06F 17/30873 709/227 |
| 8,234,346 B2 * | 7/2012 | Rao | G06Q 30/08 709/207 |
| 2001/0043795 A1 | 11/2001 | Wood et al. | |
| 2002/0009283 A1 | 1/2002 | Ichioka et al. | |
| 2002/0052864 A1 | 5/2002 | Yamamoto | |
| 2002/0116713 A1 | 8/2002 | Mukai et al. | |
| 2002/0178448 A1 * | 11/2002 | Te Kiefte et al. | 725/46 |
| 2003/0033603 A1 * | 2/2003 | Mori et al. | 725/46 |
| 2003/0041327 A1 | 2/2003 | Newton et al. | |
| 2003/0066068 A1 * | 4/2003 | Gutta | G06F 17/30867 725/9 |
| 2003/0066090 A1 * | 4/2003 | Traw et al. | 725/114 |
| 2003/0101449 A1 | 5/2003 | Bentolila et al. | |
| 2003/0106057 A1 | 6/2003 | Perdon | |
| 2003/0225777 A1 * | 12/2003 | Marsh | H04N 7/163 |
| 2003/0233655 A1 | 12/2003 | Gutta et al. | |
| 2004/0073919 A1 * | 4/2004 | Gutta | H04N 7/16 725/35 |
| 2004/0111756 A1 * | 6/2004 | Stuckman et al. | 725/142 |
| 2004/0117829 A1 * | 6/2004 | Karaoguz et al. | 725/46 |
| 2004/0123318 A1 * | 6/2004 | Lee et al. | 725/46 |
| 2004/0216168 A1 * | 10/2004 | Trovato et al. | 725/135 |
| 2005/0076093 A1 * | 4/2005 | Michelitsch et al. | 709/217 |
| 2006/0020662 A1 * | 1/2006 | Robinson | G06F 15/16 709/203 |
| 2007/0038567 A1 * | 2/2007 | Allaire | G06Q 30/0239 705/50 |
| 2007/0039023 A1 | 2/2007 | Katoaka | |
| 2008/0288982 A1 * | 11/2008 | Pronk et al. | 725/46 |

FOREIGN PATENT DOCUMENTS

| | | |
|---|---|---|
| JP | 2001326867 A | 11/2001 |
| RU | 2301503 C2 | 6/2007 |
| WO | WO0040021 A1 | 7/2000 |
| WO | WO0040028 A1 | 7/2000 |
| WO | WO0115449 A1 | 3/2001 |
| WO | 02080552 A2 | 10/2002 |
| WO | WO02080522 A1 | 10/2002 |
| WO | WO2004025510 A2 | 3/2004 |
| WO | 2005027512 A1 | 3/2005 |
| WO | WO2005059791 A1 | 6/2005 |

OTHER PUBLICATIONS

Wittig et al: "Intelligent Media Agents in Interactive Television Systems"; Proceedings of the International Conference on Multimedia Computing and Systems, Los Alamitos, CA, 1995, pp. 182-189.

* cited by examiner

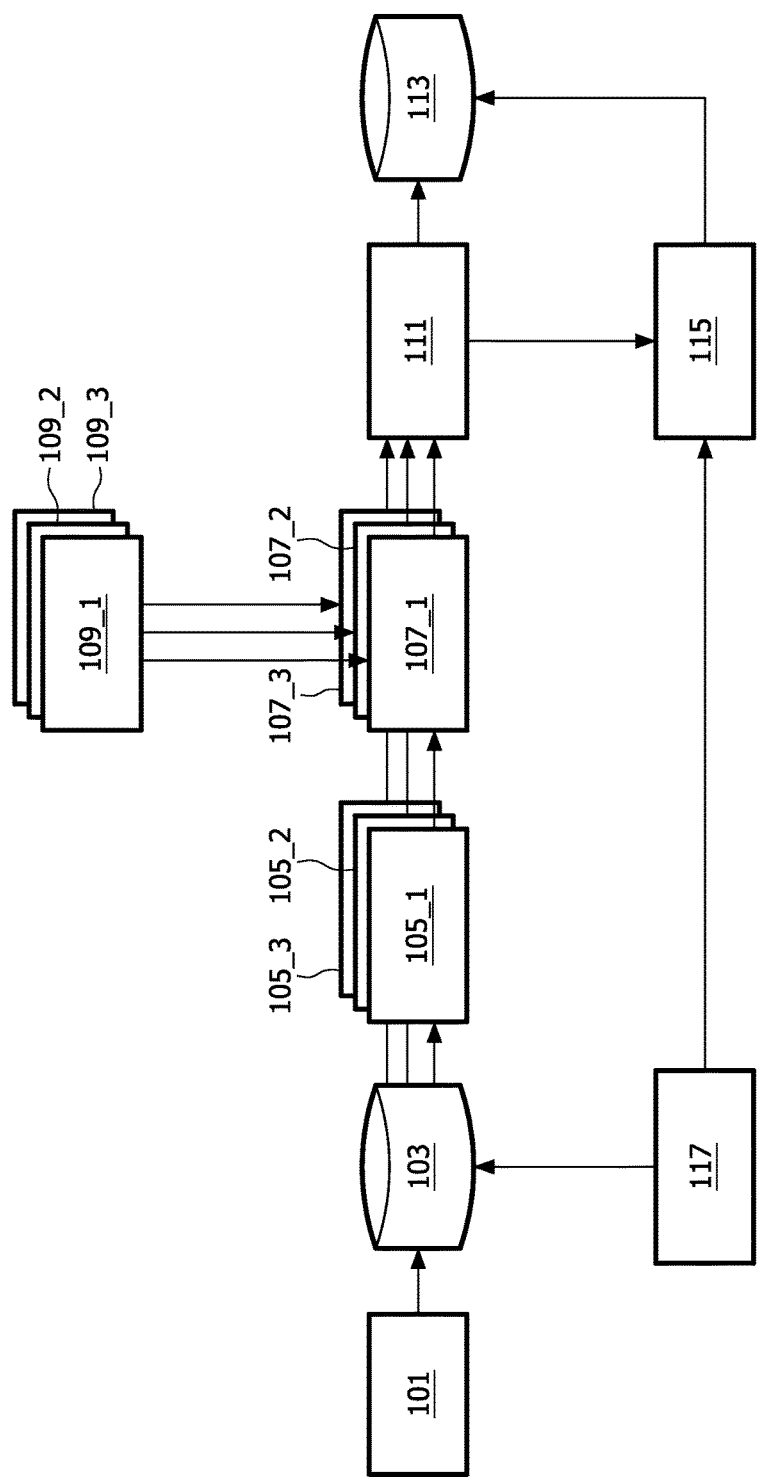

METHOD AND APPARATUS FOR GENERATING A RECOMMENDATION FOR AT LEAST ONE CONTENT ITEM

FIELD OF THE INVENTION

The invention relates to generating a recommendation for at least one content item, e.g. for TV programs and/or songs.

BACKGROUND OF THE ART

The concept of virtual channels is well known, for example as disclosed by WO-02/080552 and WO-00/40021. These channels enable easy navigation through and management of recorded programs as well as their recording and deletion on a personal video recorder (PVR). Personalized content channels are channels whose content is not solely defined by a broadcaster. In certain virtual channel systems, each personalized content channel is defined by a boolean filter that operates typically on the metadata associated with the input content item (TV program) which is derived from an electronic program guide (EPG) such that only those content items whose metadata satisfy this filter are included on the personalized content channel. It is inherently multi-user oriented, as each user can define his own set of channels, without requiring explicit user identification.

Although the filters are capable of defining dedicated channels, they are, as such, not particularly suited for a more refined tuning towards the specific taste of the user or users of a personalized content channel, as this is a task of greater complexity. For example, a personalized content channel may have romantic dramas recorded on disk, but the user might only watch some of them, whereas others seem to be of less interest to the user. Finding out the differences between these two categories of movies is generally not easy and, in particular, possibly unknown to the user.

Certain virtual channel systems use a recommender to determine which content items to play out in a virtual channel. TV-program recommenders are becoming increasingly popular in PVRs such as TiVo to provide a more personalized service by learning the preferences of a user (or group of users), for example, by maintaining and analyzing watching behavior, and, based on these preferences, recommend or automatically record programs of interest to the user(s). In comparison with boolean filters, recommenders are less predictable, i.e. can provide a user with surprising suggestions.

Such a recommender system, however, suffers from the drawback that it must be able to do user identification, e.g., by a log-in procedure or by using face recognition, to ensure which user is operating the device and who's preferences to use.

SUMMARY OF THE INVENTION

It is the aim of this invention to provide a method of generating a recommendation which does not require a log-in procedure or face recognition.

In accordance with an aspect of the present invention, there is provided a method of generating a recommendation for at least one content item, the method comprising the steps of: determining a like or dislike of a content item played out on a personalized content channel; updating a profile on the basis of the determined like or dislike, the profile being associated with said personalized content channel; and generating a recommendation for at least one further content item on the basis of said profile. A content item may be, for example, a TV program or a song. The further content item may be an already rated content item. This is especially advantageous in personalized music channels. With the method of the invention, multiple users or groups of users can each tune into a different personalized content channel which will each, over time, adapt to the likes and dislikes of the user or groups of users tuning into the respective personalized content channels. Furthermore, the method of the invention provides the possibility to extrapolate the taste of individuals into the taste they demonstrate when watching TV as a group.

The method may further comprises the step of filtering each content item on said personalized content channel such that only content items that meet predetermined selection criteria are played out on said personalized channel. This reduces the 'cold-start' problem. Initially, the recommender is unable to provide any meaningful suggestion to the user—this is the well-known 'cold-start' problem. The recommender may take a long time to learn the user's preferences, because it has to build a sufficient understanding of a user's taste across the whole range of available programs. Filtering content with a simple boolean filter ensures that the user can immediately enjoy personalized content on their personalized channel(s).

In accordance with another aspect of the present invention, there is provided an apparatus for generating a recommendation for at least one content item, the apparatus comprising: a profile store for storing a profile, the profile being associated with a personalized content channel and being updated on the basis of a determined like or dislike of a content item played out on said personalized content channel; and at least one recommender engine for generating a recommendation for at least one further content item on the basis of said profile.

The profile may also be updated on the basis of a determined like or dislike of a content item which has been selected from a list of items shown to the user as a text list or as a display of trailers or promos.

In combining the concept of the personalized content channel and recommender technology, recommendations are made on the basis of the profile of the personalized content channel. In this way, the recommenders always operate within the context of a personalized content channel. Hence, even without or with only little profile data, the combination of a personalized content channel and recommended technology produces reasonable 'recommendations', although not yet sufficiently personalized. For instance, recommending news programs within the scope of a News channel is always perceived as correct. Further, since a recommender is associated with a personalized content channel, it operates on a reduced set of content items.

Further, the system collects user feedback to indicate like or dislike within the context of a personalized content channel. This is very-suited for multi-user operation as it directly builds up an appropriate profile for a personalized content channel. And the concept of personalized content channels allows the creation of channels for individuals as well as for groups of people. As such, it eliminates the issue of user identification for these recommendations.

The recommenders may be associated with a different subset of personalized content channels. For example, the apparatus may comprise one overall recommender engine associated with all the personalized content channels or the apparatus may comprise one recommender engine per personalized content channel.

BRIEF DESCRIPTION OF THE DRAWING

For a complete understanding of the present invention, reference is made to the following description in conjunction with the accompanying drawing, in which:

FIG. 1 is a schematic block of the apparatus according to an embodiment of the present invention.

DETAILED DESCRIPTION

Apparatus according to an embodiment of the present invention is shown in FIG. 1. The apparatus comprises an information data store 103 connected to a source 101.

The source 101 may, for example, be an electronic program guide (EPG) service on the Internet, which provides the information data. The information data store 103 is connected to a plurality of filters 105_1, 105_2, 105_3. Each filter 105_1, 105_2, 105_3 is associated with a first, second and third personalized content channel. Although three channels are illustrated in this embodiment, it can be appreciated that the apparatus may comprise any number of channels. The output of each filter 105_1, 105_2, 105_3 is connected to a respective recommender engine 107_1, 107_2, 107_3.

Therefore, each personalized content channel has a recommender engine associated therewith. Each recommender engine 107_1, 107_2, 107_3 and hence personalized content channel has a profile 109_1, 109_2, 109_3 associated therewith. Each output of each recommender engine 107_1, 107_2, 107_3 is connected to a scheduler 111. The scheduler 111 is connected to a storage device 113, e.g. a set of hard disk drives, and to a selector 115. The information data store 103 is also connected to a content source 117. The content source 117 provides at least audio/video information in a broadcasting or on demand fashion. In addition, the content source may provide information data, e.g. EPG information inside the vertical blanking interval of the video signal, or MPEG-7 metadata on segments of a particular content item (e.g. the scene boundaries of a movie). The content source is connected to the selector 115 comprising at least one set of content isolation means (e.g. a DVB tuner) allowing to isolate one or more content items for recordal on the storage device 113. The output of the selector 115 is connected to the storage device 113.

The operation of the apparatus of FIG. 1 will now be described. Information data of a current content item to be played out on a personalized content channel is gathered from the Internet 101 or obtained via other means, e.g., via transmission in the vertical blanking interval of analog TV broadcast signals or via DVB transport streams, or combinations of any of the above. A content item may be a TV program, data stream containing video and/or audio data or a segment of a program etc.

The information data comprises a plurality of attributes and attribute values associated with the content item such as title, actors, director and genre.

Each profile 109_1, 109_2, 109_3 is based on the information data, together with data indicating the "like" or "dislike". The "like" and "dislike" is based on feedback on content items that pass the associated filter 105_1, 105_2, 105_3. This feedback is given by the users that use the particular personalized content channel.

The "like" or "dislike" indications can be made in several ways. For example, the user can, using a remote control device, indicate for a currently selected content item or a given attribute of the current content item "like" or "dislike" by pressing appropriate buttons on the remote control device whilst viewing the current content item. Alternatively, the behavior of the user can be observed. For example, if the user watches a current content item for more than a pre-defined time interval (for example, 20 minutes), this could automatically indicate "like". In a more advanced setting, a "like" degree on a discrete or continuous scale is provided or calculated instead of just a "like" or "dislike" classification. Various recommender algorithms that operate in this way are readily known in the art and are not described in detail here.

A "like" indication sets a classification flag which is associated with each attribute and attribute value of the current content item and this is stored in the profile 109_1, 109_2, 109_3 of that personalized content channel that included the current content item.

When the information data of a content item passes one or more of the filters 105_1, 105_2, 105_3, this information data is forwarded to the corresponding recommender engines from among the recommender engines 107_1, 107_2, 107_3. Each of said corresponding recommender engines calculates a like degree, based on its associated profile from among the profiles 109_1, 109_2, 109_3, for this subsequent content item. The information data associated to the subsequent content item is then forwarded, along with the computed like degree, to the scheduler 111, which subsequently computes a recording schedule that will be used to schedule the recording of content items offered by the recommender engines 107_1, 107_2, 107_3 onto the storage device 113. In particular, the scheduler 111 will primarily consider the content items of high like degree while still considering sufficient, new content for each personalized content channel.

To this end, the recording schedule computed by the scheduler 111 is used to instruct the selector 115 to select the content items available from the content source 117 to record them on the storage device 113.

In accordance with the apparatus of the preferred embodiment, each recommender engine 107_1, 107_2, 107_3 is used as an additional, personalized filter, for example, in series with the filters 105_1, 105_2, 105_3.

Although a preferred embodiment of the present invention has been illustrated in the accompanying drawing and described in the foregoing detailed description, it will be understood that the invention is not limited to the embodiments disclosed, but is capable of numerous modifications without departing from the scope of the invention as set out in the following claims.

The invention claimed is:

1. A recommendation apparatus for generating a recommendation for at least one content item, comprising:

a filtering unit associated to a plurality of personalized content channels and configured to filter content items complying with predetermined criteria associated with the filtering unit, wherein only content items selected by said filtering unit are played out on said personalized content channels, wherein the filtering unit includes a plurality of filters and each filter is associated with a corresponding one of the plurality of personalized channels;

a recommendation engine unit connected to an output of said filtering unit and associated to said plurality of personalized content channels, wherein said recommendation engine and said filtering unit operate in series, wherein said recommendation engine unit is configured to calculate a recommendation score for said content items previously selected by said filtering unit, wherein said recommendation engine unit includes a plurality of recommendation engines, wherein each recommendation engine is associated with a corresponding one of the plurality of personalized channels such that each filter is associated with a corresponding recommendation engine and personalized content channel;

a profile store device for storing user profiles, wherein each of said user profiles is associated to a corresponding one of said plurality of personalized content channels;

a user interface;

a processor operating and coupled with said profile store device, said filtering unit, and said recommendation engine, the processor executing the steps of, without requiring a user to log in:

filtering each content item using said filtering unit such that only content items that meet predetermined selection criteria of the filters are selected for playing out on said corresponding personalized content channels;

forwarding a list of said selected content items, for each of said filters, to said recommendation engine unit;

calculating a recommendation score using said recommendation engine unit for said selected content items on the basis of said user profile associated to said corresponding personalized channel;

a scheduler configured to:

receive a list of content items selected by said filtering unit and the corresponding recommendation scores from said recommendation engine;

schedule each content item selected by said filtering unit on the basis of the received recommendation scores; and select at least one content item for subsequent playout according to the schedule;

wherein the processor is further configured to:

determine at least one of a like and a dislike of a content item being played on said corresponding personalized channel by monitoring actions taken by a viewer through said user interface regarding said content item as said content item is being played on the personalized channel; and update the user profile stored in said profile store associated with said personalized channel on the basis of the determined at least one like and dislike associated with said content item being played on a corresponding one of said plurality of personalized channels, said update including updating each attribute of the content item with one of the at least one like and dislike such that an understanding of a user's preferences in the plurality of user profiles increases over time.

2. The recommendation apparatus according to claim 1, wherein the step of filtering each content on a corresponding one of said personalized channels such that only contents that meet the predetermined selection criteria are plated out on said personalized channel comprises filtering each content with a Boolean filter.

3. A recommendation apparatus for generating a recommendation for at least one content item, comprising:

a filter associated to a personalized content channel and configured to filter content items complying with predetermined criteria associated with the filtering, wherein only content items selected by said filter are played out on said personalized content channel;

a recommendation engine connected to an output of said filter and associated to said personalized content channel, wherein said recommendation engine is configured to calculate a recommendation score for said content items previously selected by said filter, wherein said recommendation engine operates in series with said filter;

a profile store device for storing a user profile;

a user interface;

a processor operating and coupled with said profile store device, said filter, and said recommendation engine, the processor executing the steps of, without requiring a user to log in:

filtering each content item using said filter such that only content items that meet the predetermined selection criteria are selected for playing out on said corresponding personalized channel;

forwarding a list of selected content items to said recommendation engine;

calculating the recommendation score for the selected content items in the list based on the user profile associated to said personalized content channel;

a scheduler configured to:

receive the list of content items selected by said filter and the corresponding recommendation scores from said recommendation engine;

schedule each content item selected by said filter on the basis of the received recommendation scores; and select at least one content item for subsequent playout according to the schedule;

wherein the processor is further configured to:

determine at least one of a like and a dislike of a content item being played on said personalized content channel by monitoring actions taken by a viewer through said user interface regarding said content item as said content item is being played on the personalized content channel; and update the user profile stored in said profile store associated with said personalized content channel on the basis of the determined at least one like and dislike associated with said content item being played on said personalized content channel, said update including updating each attribute of the content item in the user profile with one of the at least one like and dislike.

4. The recommendation apparatus according to claim 3, further comprising:

a filtering unit, the filtering unit including a plurality of filters;

a recommendation engine unit, the recommendation engine unit including a plurality of recommendation engines;

wherein the profile store unit stores a plurality of user profiles, wherein each of the plurality of filters is associated a corresponding one of the plurality of recommendation engines and a corresponding one of the plurality of user profiles.

5. A recommendation apparatus for generating a recommendation for at least one content item, the apparatus comprising:

an information store device configured to store electronic program guide data that is retrieved from at least one source, the electronic program guide data associated with content items;

a filter associated to a personalized content channel and configured to filter the content items by applying predetermined criteria to the electronic program guide data, wherein only content items selected by said filter are played out on said personalized content channel;

a profile store device for storing a user profile;

a recommendation engine connected in series to an output of said filter, connected to the profile store device, and associated to said personalized content channel;

a user interface;

a processor operating and coupled with said profile store unit, said filter, and said recommendation engine, the processor executing:

filtering each content item using said filter to generate a list of selected content items such that only content items that meet the predetermined selection criteria are selected for playing out on said corresponding personalized channel;

forwarding the list of selected content items to said recommendation engine;

calculating a recommendation score for the selected content items in the list based on the user profile associated to said personalized content channel, wherein the filter, the user profile and the recommendation engine allow personalized content to be recommended for playing on the personalized content channel including when the user profile does not have a sufficient understanding of a user's preferences;

a scheduler configured to:

receive the list of content items selected by said filter and the corresponding recommendation scores from said recommendation engine;

schedule each content item selected by said filter on the basis of the received recommendation scores; and select at least one content item for subsequent playout according to the schedule;

wherein the processor is further configured to:

determine at least one of a like and a dislike of a content item being played on said personalized content channel by monitoring actions taken by the user through said user interface regarding said content item as said content item is being played on the personalized content channel; and update the user profile stored in said profile store associated with said personalized content channel on the basis of the determined at least one like and dislike associated with said content item being played on said personalized content channel, said update including updating each attribute of the content item in the user profile with one of the at least one like and dislike, wherein the user profile changes over time such that the recommendation score calculated by the processor change over time as the understanding of the user's preferences increases.

6. The apparatus of claim 5, wherein the recommendation is generated without requiring a user to log in.

* * * * *